(12) United States Patent
Tiwari et al.

(10) Patent No.: US 6,327,421 B1
(45) Date of Patent: Dec. 4, 2001

(54) MULTIPLE SPEED FAST FORWARD/REWIND COMPRESSED VIDEO DELIVERY SYSTEM

(75) Inventors: Prasoon Tiwari, Yorktown Heights, NY (US); Eric Viscito, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/037,624

(22) Filed: Mar. 10, 1998

(51) Int. Cl.[7] ............................. H04N 5/783; H04N 5/928
(52) U.S. Cl. .................................................. 386/68; 386/96
(58) Field of Search ..................................... 386/109, 111, 386/112, 68, 69, 27, 33, 46, 96, 104, 102; 360/32; H04N 5/783, 5/928

(56) References Cited

U.S. PATENT DOCUMENTS

| | | | |
|---|---|---|---|
| 4,777,537 | * | 10/1988 | Ueno et al. ............................. 386/96 |
| 5,282,049 | * | 1/1994 | Hatakenaka et al. ................... 386/68 |
| 5,377,051 | * | 12/1994 | Lane et al. .......................... 360/33.1 |
| 5,694,170 | | 12/1997 | Tiwari et al. . |
| 6,058,240 | * | 5/2000 | McLaren ................................ 386/68 |

OTHER PUBLICATIONS

"A Parallel MPEG–2 Video Encoder With Look–Ahead Rate Control," Tiwari et al., IBM Corporation, Thomas J. Watson Research Center, 1997.

* cited by examiner

*Primary Examiner*—Robert Chevalier
(74) *Attorney, Agent, or Firm*—Ohlandt, Greeley, Ruggiero & Perle, LLP; Daniel P. Morris, Esq

(57) ABSTRACT

The invention supports visual fast-forward play and rewind at multiple speeds using a single ancillary data stream. The storage required by this data stream is approximately the same as the storage required by a single ancillary data stream used in conventional single speed fast-forward and rewind schemes. The method of the invention includes the following steps. A bitstream of the original sequence of MPEG compressed pictures is stored for normal play. Then a sub-sequence of the original sequence, consisting of every n-th picture, is compressed as I-pictures, while ensuring that all pictures in the compressed stream have equal numbers of bits. This is the ancillary stream. A client request for fast-forward play is responded to by transmitting a subset of I-pictures from the ancillary stream. A fast-reverse play request is satisfied in the same manner except that the I-frames are transmitted in the reverse order.

14 Claims, 2 Drawing Sheets

MULTIPLE SPEED FAST FORWARD/ REWIND COMPRESSED VIDEO DELIVERY SYSTEM

FIELD OF INVENTION

The present invention relates to the field of fast-forward and fast rewind functions implemented in MPEG video delivery systems including video-servers and clients.

BACKGROUND OF THE INVENTION

Technological advances in digital transmission networks, video servers, digital storage media, very large scale integration devices and digital processing of video and audio signals are converging to make the transmission and storage of digital video economical in a wide variety of applications. Because the storage and transmission of digital video signals is central to many applications, and because an uncompressed representation of a video signal requires a large amount of storage and network bandwidth, the use of digital video compression is vital to this advancing art. In this regard, several international standards for the compression of digital video signals have emerged over the past decade, with more currently under development. Of these video compression standards, the ones used most widely are the MPEG standards.

MPEG video employs three types of compressed "pictures", i.e. I, P and B types. I and P pictures are called anchor pictures. An I picture can be decoded by itself without resort to other data. A P picture requires data from a previously decompressed anchor picture to enable its decompression. A B picture requires data from both preceding and succeeding anchor pictures to allow its decompression.

MPEG compressed digital video is often stored on a video server and is delivered on demand to a client. Many interactive video servers are required to support "trick play" modes, i.e., fast-forward-play and fast-reverse-play (rewind). While watching a video, the client may request fast-forward-play or fast rewind.

Several methods are used to allow interactive video servers to perform fast-forward play and fast-rewind play. An obvious potential solution to the problem is to supply the user with I-pictures in the fast-forward mode, but this results in jerky picture quality because of uneven I-picture spacing, and because certain buffering constraints are violated. In addition, since I-pictures are large, fast-forward will result in higher data rates than in the normal play mode, if every I frame is displayed.

In order to keep the data rate constant during fast-forward play, video servers use an ancillary data stream which is constructed as follows. To obtain a fast-forward play speed of n, a new video consisting of every n'th picture of the original video, is constructed. This new video is then compressed to an I-picture only stream of MPEG video, using MPEG compression parameters (including the bitrate) identical to those used in compressing the original video.

The rewind function is provided by another ancillary stream. This stream is constructed in exactly the same manner as the ancillary stream for fast-forward play, except that every n'th picture of the original video is picked in the reverse order, starting with the last picture. The drawback of this conventional scheme is that for every fast-forward or rewind speed needed, another ancillary stream is needed. This makes the storage required for multiple speed fast-forward and rewind actions prohibitively expensive.

An economical method is needed for allowing multiple speed fast-forward and reverse play of MPEG video.

SUMMARY OF THE INVENTION

The invention supports fast-forward play and rewind at multiple speeds using a single ancillary data stream. The storage required by this data stream is approximately the same as the storage required by a single ancillary data stream used in conventional single speed fast-forward and rewind schemes. The method of the invention includes the following steps. The original video sequence is compressed to yield a normal-play bitstream. The sub-sequence of the original sequence, consisting of every n'th picture, is compressed to generate an ancillary stream. The compression for the ancillary stream is such that each picture in it is an I-picture compressed using equal numbers of bits. A client request for a fast forward scan of the sequence is responded to by selecting a subset of pictures from the ancillary stream for transmission to the client.

DETAILED DESCRIPTION OF THE PREFERRED EMBODIMENTS

As the present invention may be applied in connection with MPEG-1 formatted data and to facilitate an understanding of the invention, some pertinent aspects of the MPEG-1 video compression will be reviewed. It should be noted that the invention can be applied to other video compression schemes, such as MPEG-2, which share some of the features of the MPEG-1 standard.

An MPEG-1 system bitstream can be regarded as a layered structure which includes an MPEG-1 video bitstream and an MPEG-1 audio bitstream which are packed together with systems information and possibly other bitstreams. Within the video layer of the MPEG-1 system bitstream, the compressed data is further layered. A description of the organization of the layers will aid in understanding the invention. The layers pertain to the operation of the compression scheme as well as the composition of a compressed bitstream.

Figure 1:
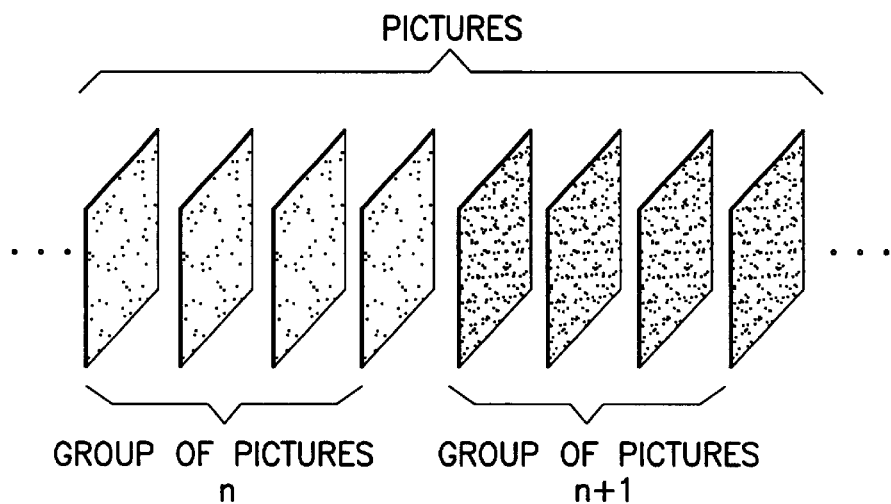
FIG. 1 schematically shows groups of pictures in an MPEG data stream.

The highest layer is the Video Sequence Layer. It starts with a Sequence Header that contains control information and the parameters for the entire sequence of pictures. The next layer is subdivided into sets of consecutive pictures, known as a Group of Pictures (GOP), and starts with a GOP Header. A general illustration of this layer is shown in FIG. 1. Decoding may begin at the start of any GOP, essentially independent of any preceding GOPs. There is no limit to the number of pictures which may be in a GOP, nor do there have to be an equal number of pictures in all GOPs in a video sequence. Typically, a GOP consists of a set of pictures of half-second duration.

The third or "Picture" layer is a single picture. It begins with a picture header. All of the Sequence, GOP and Picture headers begin with byte-aligned "Start Codes" and contain information pertinent to the data contained in the corresponding layer. Within a GOP, three "types" of pictures can appear. The distinguishing feature among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation.

Predictively motion-compensated pictures or P-pictures, are reconstructed from the compressed data in that picture and from the most recently reconstructed data from previously displayed I or P pictures.

Bidirectionally motion compensated pictures or B-pictures, are reconstructed from the compressed data in that picture plus the reconstructed data from a previously displayed I or P picture and the reconstructed data from I or P pictures that will be displayed in the future. Because reconstructed I or P pictures can be used to reconstruct other pictures, they are called anchor pictures.

The Picture Header starts with a 4 byte picture start code. One of the parameters specified in the Picture Header is vbv_delay. This is the amount of time a decoder will wait after receiving the final byte of the picture start code before decoding the picture. This important parameter is used to ensure that the decoder buffer does not overflow or underflow. If an incorrect vbv_delay is specified, the decoder buffer may overflow or underflow, and the video presentation will not be smooth.

For instance, in a constant bitrate operation, the buffer is filled by incoming data at a constant rate. Bits for a next picture to be decoded are removed from the buffer at regular intervals, e.g., picture by picture at a set rate. It is important that the buffer occupancy always stays between zero and full buffer capacity. However, if bits for a picture, which is compressed using a large number of bits, are deleted from the bitstream (for example, to yield the bitstream for a fast forward/rewind operation), and the next picture has a small number of bits, then the client buffer may overflow.

The frame-rate, the bit-rate, and the size of the decoder buffer are specified in the Sequence Header. U.S. Pat. No. 5,694,170, entitled "Video Compression Using Multiple Computing Agents" to Tiwari et al. and assigned to the same Assignee as this Application, describes a method of allocating bits to GOPs, and then compressing all pictures in a GOP to the allocated number of bits. In the preferred embodiment therein, the number of bits allocated to a GOP is proportional to the number of pictures in the GOP. (Since the preferred embodiment is in the context of MPEG2, the allocated bits there are proportional to the number of fields in a GOP.) In particular, if all GOPs contain equal number of pictures, then all GOPs are compressed using an equal number of bits.

Embodiment for Multiple Speed Trick Modes in MPEG-1 Video Stream

Figure 2:
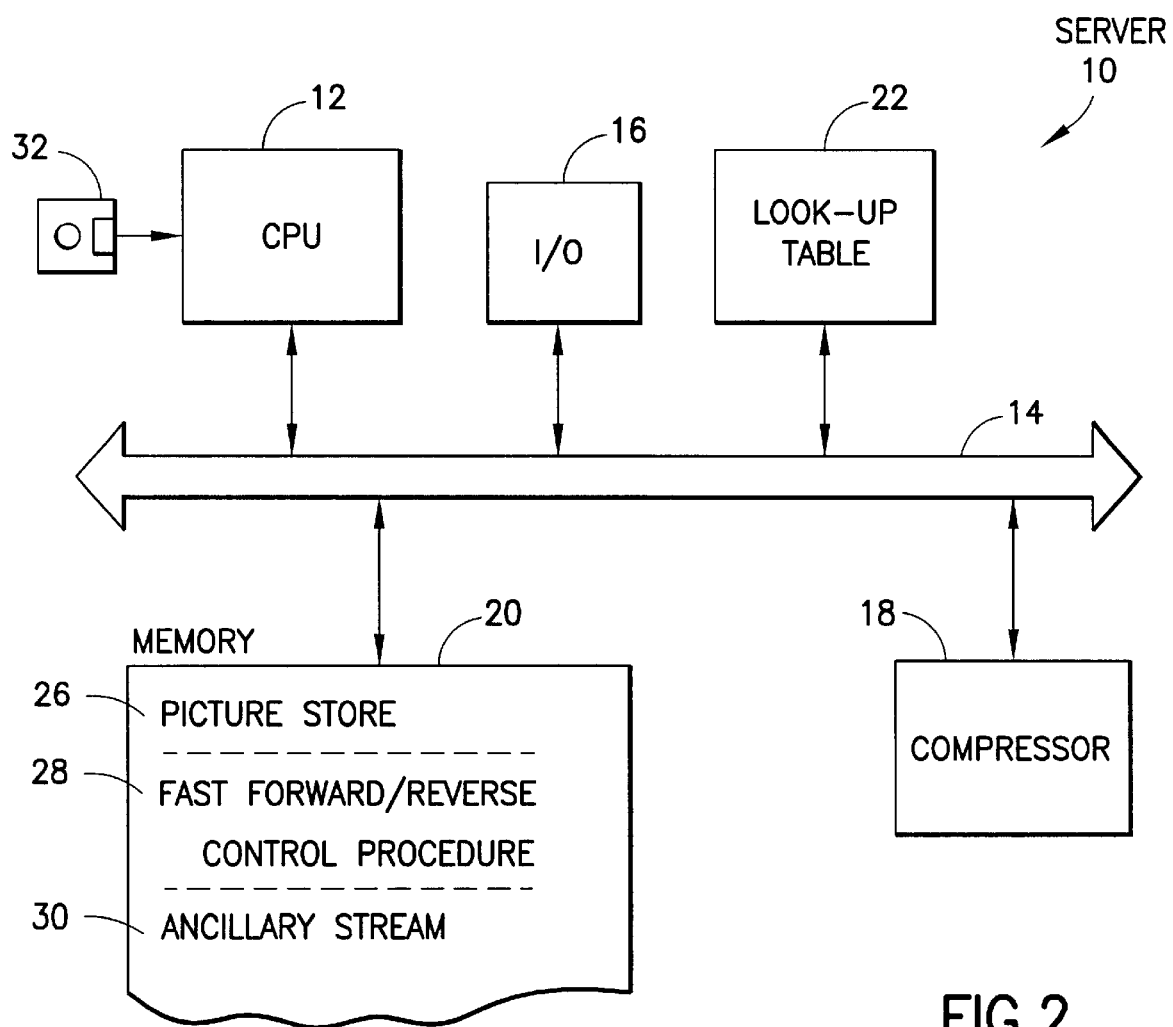
FIG. 2 is a high level block diagram of a server for performing the invention.

Referring to FIG. 2, a high level block diagram of a server 10 is shown which is adapted to carry out the invention. Server 10 includes a central processing unit (CPU) 12 which is coupled to other elements of server 10 via a bus system 14. An Input/Output (I/O) module 16 provides a picture stream to a client in response to received instructions from the client. As will become apparent, the invention is concerned with economically responding to a received fast forward or fast rewind instruction from the client.

A compressor module 18 is coupled to bus system 14 and performs an I picture compression encoding action on pictures that comprise the fast forward/rewind data stream. As will be hereafter apparent, it is vital that each compressed picture exhibits an identical number of bits in the encoded I picture state to assure that buffer overflow/underflow constraints are observed and an MPEG format is maintained. Memory 20 provides storage for compressed picture data 26, for a fast forward/rewind procedure 28 and compressed picture data 30 constituting an ancillary stream. That data, in conjunction with CPU 12 and compressor 18, implements the invention. Note, that while the data which controls the operation of the invention is indicated as being stored in memory 20, such data can also be stored on a diskette 32 or other type of removable memory device and used to control the operation of the invention.

Figure 3:
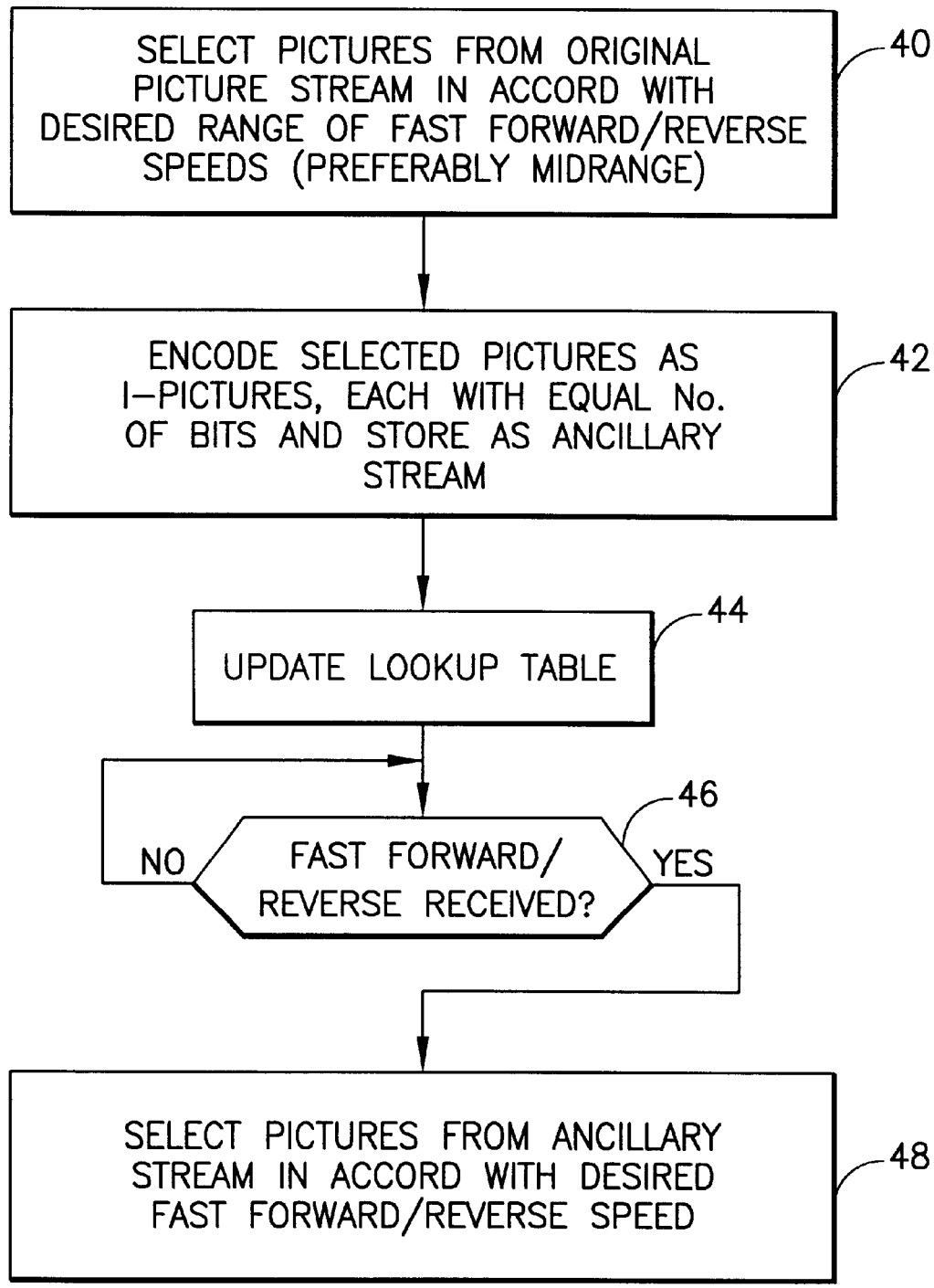
FIG. 3 is a logic flow diagram illustrating the procedure of the invention.

This invention uses an ancillary bitstream 30 of compressed pictures and a lookup table 22 to achieve fast-forward/rewind play. It is assumed that each GOP in the original stream is preceded by a Sequence header. Initially (see FIG. 3), a range of fast-forward/rewind speeds is decided upon. Then a subset of the pictures of original picture stream 26 is selected as ancillary stream 30 (e.g., every n'th picture in the picture stream) which, if transmitted in their entirety, will result in a fast-forward/rewind speed that is in a midrange of the selected range of speeds (step 40). Thereafter the ancillary stream pictures are encoded as I pictures, with each picture exhibiting an identical number of bits and the pictures are stored in memory 20 as ancillary stream 30 (step 42). Look-up table 22 is updated to identify the encoded pictures (step 44). Then, when a fast forward/ rewind action at a certain speed is requested (step 46), a set of compressed pictures are chosen from ancillary stream 30 which, at the constant transmission bitrate, will provide the desired fast-forward/rewind action (step 48). Importantly, the feature of each picture including an identical number of bits assures that there will be no buffer overruns or underruns at the receiver (in the MPEG transmission mode).

Suppose that fast-forward speeds in the range 3 to 27 are desired. CPU 12 causes compressor 18 to use I-only encoding to compress a sub-sequence of pictures consisting of every 9th picture of the original sequence 26 to derive ancillary stream 30. Then if it is desired to fast forward at the slowest speed (i.e., 3) each compressed picture is transmitted three times. By contrast, if the fast forward is at the fastest speed (i.e. 27), only one of every three of the compressed pictures of ancillary stream 30 is transmitted.

During the encoding of the pictures, it is ensured that:
1. all pictures use the same number of bits in the resulting bitstream,
2. all pictures are also preceded by a sequence header and a GOP header, and
3. compression parameters (including the bitrate and the frame rate) identical to those used in compressing the original stream are used.

In the following discussion of the ancillary bitstream, when "bits of a picture in the ancillary bitstream" are referred to, the bits of the preceding Sequence and GOP headers are included. Since the bitrate of the ancillary bitstream is identical to the bitrate of the original bitstream of pictures, but contains only ⅑th of the pictures, the storage penalty on server 10 is small, i.e., only 11 percent. If a lower bit rate can be used in trick play modes, this penalty is reduced further.

The original and the ancillary bitstreams 26 and 30 are stored in memory 20 of server 10. In addition, look-up table 22 is constructed as follows: For every 9th picture in the original sequence (assuming fast-forward/reverse speeds of 3–27), the byte offset to the start of the nearest GOP is stored. This byte offset points to the start of the sequence header preceding the GOP. Now, in order to start fast-forward play at the L'th picture in the original stream, go to the M'th picture in the ancillary stream where M=floor((L+

4)/9), where "floor" is the largest integer that is less than or equal to the exact value of the expression.

If every picture in ancillary stream 30 is compressed using B bytes, then the byte offset for the M'th picture is (M*B). If r is the bitrate and f is the frame rate, then B is chosen to be r/(8*f). A method of video compression meeting these requirements is described in the above-referenced patent to Tiwari et al., the disclosure of which is incorporated herein by reference.

Starting with the bits for the M'th picture, the bits of each picture of the ancillary stream are sent to the client. This results in a 9× fast-forward play, since the original selection of pictures was one of each nine pictures. In order to obtain a 3× fast-forward play, the bits for every picture in the ancillary stream are sent three times, starting at the M'th picture in the ancillary stream. Further, the number of pictures sent per second must be identical to the frame rate of the original bitstream.

In order to obtain a 27× fast-forward play, send the bits for every third picture once, starting at the M'th picture in the ancillary stream, again maintaining the original frame rate.

Other fast-forward speeds can also be realized. For example, send the bits for every picture twice for 4.5×; or send the bits for every other picture once for 18× while maintaining the original frame rate. Since all pictures are compressed using the same number of bits, the data rate on the channel is identical to the data rate of the original stream. Moreover, since every picture in the ancillary stream is an I-picture and has an equal number of bits, and has a sequence header in front, all the bitstreams generated above are legitimate MPEG-1 video bitstreams.

For example, the vbv_delay fields are correct, and the vbv constraints are not violated in the ancillary stream. Further, when a picture of the ancillary stream is deleted from the picture buffer, an overflow cannot occur because each new picture includes an identical number of bits.

If the fast-forward play stops at the k'th picture of the ancillary stream, then normal playback is resumed from the GOP which starts closest to the (9k)'th picture of the original bitstream. The byte offset of this GOP can be determined from lookup table 22.

Fast-reverse play can be obtained from the same ancillary file in a similar way, except that the bits for the m'th picture are followed by the bits of the (m−1)'th picture—instead of the bits of the (m+1)'th picture. Therefore, in constructing various speed fast-reverse play streams, the pictures from the ancillary stream must be read in the reverse order. (Note the order of bits within a picture is not changed.)

Also note that there may be a glitch in the stream when the original stream is switched to an ancillary stream or vice versa. The reason is that, at the transition point, the vbv_delay parameter is not correct, and therefore, decoder buffer 24 may be violated (e.g. an overflow may occur). In case the glitch is not tolerable, two additional restrictions need to be added:

1. Ensure that each GOP in the original stream starts with the same number of bits in the buffer. This implies that, if all GOPs have the same number of pictures, then each GOP is compressed using an identical number of bits.
2. Switching to and from the trick play stream should be allowed only at the GOP boundaries of the original stream.

Embodiment for Multiple Speed Trick Play Modes in MPEG-1 System Stream

A trick play scheme was described in the previous section in the context of an MPEG-1 video stream. It can be extended to an MPEG-1 system stream by adding a real-time multiplexer. The video stream is generated as described in the previous section. During normal play, it is multiplexed with a normal play audio stream; during trick mode, there is no audio and the constant system stream bitrate is maintained by multiplexing the trick mode video stream with a padding. In order to jump to the audio stream at video GOP boundaries, a table is maintained. For every GOP boundary, the table has a pointer to the corresponding place in the audio stream.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for realizing a fast play of a digitally compressed picture sequence, comprising the steps of:
   a) storing a bitstream of an original sequence of pictures;
   b) selecting every nth picture from said original sequence of pictures;
   c) creating an ancillary bitstream by encoding said every nth picture as an I-picture, while ensuring that all encoded I-pictures have equal numbers of bits, where an I-picture is a digitally encoded picture that can be decoded without resort to another digitally encoded picture;
   d) storing said ancillary bitstream;
   e) maintaining a table that associates a place in an audio stream with a boundary of a group of pictures;
   f) employing said table to enable accessing of audio play data that corresponds to said group of pictures;
   g) responding to a client request for a fast play of said sequence of pictures by selecting a subset of said I-pictures from said stored ancillary bitstream for transmission to said client; and
   h) multiplexing said subset of pictures with padding data to replace absent audio data.

2. The method as recited in claim 1, wherein said bitstream of said original sequence of pictures and said subset of said I-pictures from the ancillary bitstream are transmitted to said client at an identical bitrate.

3. The method as recited in claim 1, wherein said bitstream of said original sequence of pictures and said subset of said I-pictures both conform to a same MPEG video bitstream standard.

4. The method as recited in claim 1, wherein said selecting step b) determines n in accordance with fastest and slowest fast forward/reverse play modes to be selected by the client.

5. The method as recited in claim 4, wherein said selecting step b) sets the value of n in a midrange between said fastest and slowest fast forward/reverse play modes.

6. The method as recited in claim 1, wherein step g) comprises:
   responding to a client request for a fast reverse play of said pictures by transmitting said subset in a reverse order.

7. A memory media for controlling a computer to provide a fast play of digitally compressed pictures, comprising:
   a) means for controlling said computer to store a bitstream of digitally compressed pictures;
   b) means for controlling said computer to select every nth picture from said original sequence of digitally compressed pictures;

c) means for controlling said computer to create an ancillary bitstream by encoding said every nth picture as an I-picture, while ensuring that all encoded I-pictures have equal numbers of bits, where an I-picture is a digitally encoded picture that can be decoded without resort to another digitally encoded picture;

d) means for controlling said computer to store said ancillary bitstream;

e) means for controlling said computer to maintain a table that associates a place in an audio stream with a boundary of a group of pictures;

f) means for controlling said computer to employ said table to enable accessing of audio play data that corresponds to said group of pictures;

g) means for controlling said computer to respond to a client request for a fast play of said digitally compressed pictures by selecting a subset of said I-pictures from said stored ancillary bitstream for transmission to said client; and h) means for controlling said computer to multiplex said subset of pictures with padding data to replace absent audio data.

8. The memory media as recited in claim 7, wherein said bitstream of said original sequence of digitally compressed pictures and said subset of said I-pictures are transmitted to said client at an identical bitrate.

9. The memory media as recited in claim 7, wherein said bitstream of said original sequence of digitally compressed pictures and said subset of said I-pictures both conform to same MPEG video bitstream parameters.

10. The memory media as recited in claim 7, wherein said means b) determines n in accord with fastest and slowest fast forward/reverse play modes to be selected by the client.

11. The memory media as recited in claim 10, wherein said means b) sets the value of n in a midrange between said fastest and slowest fast forward/reverse play modes.

12. The memory media as recited in claim 7, wherein means g) comprises:

means for controlling said computer to respond to a client request for a fast reverse play of said digitally compressed pictures by transmitting said subset in a reverse order.

13. The method as recited in claim 1, wherein step g) comprises:

responding to a client request for a fast forward play of said pictures by transmitting said subset in a forward order.

14. The memory media as recited in claim 7, wherein means g) comprises:

means for controlling said computer to respond to a client request for a fast forward play of said pictures by transmitting said subset in a forward order.

* * * * *